(12) United States Patent
Weisner

(10) Patent No.: US 10,202,551 B2
(45) Date of Patent: Feb. 12, 2019

(54) DEWATERING COMPOSITIONS AND METHODS

(71) Applicant: Dober Chemical Corporation, Woodbridge, IL (US)

(72) Inventor: Anthony Weisner, Lockport, IL (US)

(73) Assignee: DOBER CHEMICAL CORP, Woodridge, IL (US)

( * ) Notice: Subject to any disclaimer, the term of this patent is extended or adjusted under 35 U.S.C. 154(b) by 199 days.

(21) Appl. No.: 14/776,653

(22) PCT Filed: Mar. 14, 2014

(86) PCT No.: PCT/US2014/028257
§ 371 (c)(1),
(2) Date: Sep. 14, 2015

(87) PCT Pub. No.: WO2014/144025
PCT Pub. Date: Sep. 18, 2014

(65) Prior Publication Data
US 2016/0032197 A1    Feb. 4, 2016

Related U.S. Application Data

(60) Provisional application No. 61/794,895, filed on Mar. 15, 2013.

(51) Int. Cl.
*C10G 33/04* (2006.01)
*C08B 31/00* (2006.01)
*B01D 17/04* (2006.01)

(52) U.S. Cl.
CPC ........... *C10G 33/04* (2013.01); *B01D 17/047* (2013.01); *C08B 31/00* (2013.01)

(58) Field of Classification Search
None
See application file for complete search history.

(56) References Cited

U.S. PATENT DOCUMENTS

| | | | |
|---|---|---|---|
| 1,559,036 A | 10/1925 | Egloff et al. | |
| 3,453,205 A | 3/1967 | Francis, Jr. et al. | |
| 4,127,563 A * | 11/1978 | Rankin | C08B 31/125 106/127.1 |
| 4,197,350 A | 4/1980 | Kleber et al. | |
| 4,913,825 A * | 4/1990 | Mitchell | C09D 7/008 210/705 |
| 5,061,346 A * | 10/1991 | Taggart | D21H 17/00 162/175 |
| 5,071,512 A * | 12/1991 | Bixler | D21H 17/29 162/175 |
| RE33,999 E | 7/1992 | Clare et al. | |
| 5,129,989 A * | 7/1992 | Gosset | D21H 17/28 162/147 |
| 5,750,492 A | 5/1998 | Contet et al. | |
| 5,989,436 A | 11/1999 | Suzumura et al. | |
| 6,033,525 A * | 3/2000 | Moffett | C08B 31/00 106/238 |
| 6,261,543 B1 * | 7/2001 | Fletcher | A61K 8/26 424/400 |
| 6,426,381 B1 * | 7/2002 | Konig | C08F 212/08 524/734 |
| 7,270,727 B2 * | 9/2007 | Varnell | C08F 226/04 162/158 |
| 2004/0030119 A1 * | 2/2004 | Likitalo | C08B 31/12 536/45 |
| 2004/0204337 A1 * | 10/2004 | Corona, III | C11D 3/227 510/515 |
| 2005/0061750 A1 * | 3/2005 | Fabri | C02F 1/56 210/728 |
| 2008/0041546 A1 * | 2/2008 | Schmid | D21H 21/16 162/164.6 |
| 2008/0275223 A1 * | 11/2008 | Adam | C12H 1/0424 530/412 |
| 2010/0282425 A1 * | 11/2010 | Karppi | C08B 31/006 162/175 |
| 2010/0326923 A1 * | 12/2010 | Miknevich | C02F 1/5245 210/734 |
| 2013/0015139 A1 * | 1/2013 | Guerrini | C08K 3/16 210/698 |
| 2013/0266669 A1 * | 10/2013 | Jiang | C02F 1/50 424/725 |
| 2013/0269894 A1 * | 10/2013 | Solhage | D21H 21/10 162/164.4 |
| 2014/0197112 A1 * | 7/2014 | Crowther-Alwyn | C02F 1/5236 210/729 |
| 2014/0251921 A1 * | 9/2014 | Miknevich | C02F 1/56 210/712 |

FOREIGN PATENT DOCUMENTS

EP    0194399 A1    9/1986
WO    2009085131 A1    7/2009

OTHER PUBLICATIONS

International Preliminary Report on Patentability, application No. PCT/US2014/028257, dated Sep. 24, 2015.

* cited by examiner

*Primary Examiner* — Joseph D Anthony
(74) *Attorney, Agent, or Firm* — Stout, Uxa & Buyan LLP; Carlos A Fisher

(57) ABSTRACT

The present invention is drawn to dewatering components and methods for their use. As particularly preferred, the invention relates to dewatering components comprising a cationic starch and/or a tannin capable of separating and/or resolving oil-in-water emulsions, water-in-oil emulsions, particularly in crude petroleum oil.

13 Claims, No Drawings

DEWATERING COMPOSITIONS AND METHODS

This international application claims priority to U.S. Provisional patent application Ser. No. 61/794,895, filed Mar. 15, 2013.

FIELD OF THE INVENTION

The present invention is drawn to compositions to cause or aid in the separation of an aqueous phase from a hydrophobic phase. For example, the invention may pertain to compositions used in the petroleum industry for dewatering crude oil from the extraction stage of oil production.

INVENTION AND BACKGROUND

Petroleum includes only crude oil, but in common usage it includes all liquid, gaseous, and solid hydrocarbons. Under surface pressure and temperature conditions, lighter hydrocarbons methane, ethane, propane and butane occur as gases, while pentane and heavier ones are in the form of liquids or solids. However, in an underground oil reservoir the proportions of gas, liquid, and solid depend on subsurface conditions and on the phase diagram of the petroleum mixture.

Within these reservoirs, fluids will typically organize themselves like a three-layer cake with a layer of water below the oil layer and a layer of gas above it, although the different layers vary in size between reservoirs. Because most hydrocarbons are less dense than rock or water, they often migrate upward through adjacent rock layers until either reaching the surface or becoming trapped within porous rocks (known as reservoirs) by impermeable rocks above. However, the process is influenced by underground water flows, causing oil to migrate hundreds of kilometers horizontally or even short distances downward before becoming trapped in a reservoir. When hydrocarbons are concentrated in a trap, an oil field forms, from which the liquid can be extracted by drilling and pumping.

An oil well produces predominantly crude oil, with some natural gas dissolved in it. Because the pressure is lower at the surface than underground, some of the gas will come out of solution and be recovered (or burned) as associated gas or solution gas.

Three conditions must be present for oil reservoirs to form: a source rock rich in hydrocarbon material buried deep enough for subterranean heat to cook it into oil; a porous and permeable reservoir rock for it to accumulate in; and a cap rock (seal) or other mechanism that prevents it from escaping to the surface. Within these reservoirs, fluids will typically organize themselves like a three-layer cake with a layer of water below the oil layer and a layer of gas above it, although the different layers vary in size between reservoirs. Because most hydrocarbons are less dense than rock or water, they often migrate upward through adjacent rock layers until either reaching the surface or becoming trapped within porous rocks (known as reservoirs) by impermeable rocks above. However, the process is influenced by underground water flows, causing oil to migrate hundreds of kilometers horizontally or even short distances downward before becoming trapped in a reservoir. When hydrocarbons are concentrated in a trap, an oil field forms, from which the liquid can be extracted by drilling and pumping.

Commonly, wells are drilled into oil reservoirs to extract the crude oil, which will contain some amount of water. "Natural lift" production methods that rely on the natural reservoir pressure to force the oil to the surface are usually sufficient for a while after reservoirs are first tapped. In some reservoirs, such as in the Middle East, the natural pressure is sufficient over a long time. The natural pressure in most reservoirs, however, eventually dissipates. Then the oil must be extracted using "artificial lift" means. Over time, these "primary" methods become less effective and "secondary" production methods may be used. A common secondary method is "waterflood" or injection of additional water into the reservoir to increase pressure and force the oil to the drilled shaft or "wellbore."

Eventually "tertiary" or "enhanced" oil recovery methods may be used to increase the oil's flow characteristics by injecting steam, carbon dioxide, hydraulic fracturing fluids, and/or other chemicals into the reservoir. In the United States, primary production methods account for less than 40 percent of the oil produced on a daily basis, secondary methods account for about half, and tertiary recovery the remaining 10 percent. Extracting bitumen from oil/tar sand and oil shale deposits requires mining the sand or shale and heating it in a vessel or retort, or using "in-situ" methods of injecting heated water into the deposit and then pumping out the oil-saturated liquid.

Vast quantities of water, in the form of steam, are used to liquefy and extract petroleum from tar sands, an unconventional oil reserve. When oil-eating bacteria biodegrade oil that has escaped to the surface, tar sands, such as the Athabasca oil sands in Canada, can result. Tar sands (more properly termed bituminous sands) are reservoirs of partially biodegraded oil still in the process of escaping and being biodegraded, but they contain so much migrating oil that, although most of it has escaped, vast amounts are still present—more than can be found in conventional oil reservoirs. Canada and Venezuela have the world's largest deposits of oil sands.

Thus, crude oil from many sources, both conventional and unconventional, contains amounts of water that can vary from a percentage of the extracted petroleum to a multiple of the total volume of extracted petroleum. This water, which is often in an emulsion with the extracted petroleum, must be separated from the oil before the oil can be further refined and used.

Various methods exist for dehydrating, or dewatering, crude oil. Thus, U.S. Reissue Pat. No. RE33999 is drawn to a method and apparatus for removing residual water from heavy crude oil. The apparatus comprises a distillation apparatus comprising a casing, an inlet for admitting liquid crude oil into the casing so as to establish a liquid surface in the casing, an outlet passage for discharging dehydrated liquid crude oil from the casing, a heater in the casing for maintaining the liquid oil at a distillation temperature for evaporating water and light hydrocarbons, a vapor outlet for discharging a mixture of water vapor and light hydrocarbons evaporated from the crude oil, a spray device above the surface of the liquid in the casing for spraying incoming crude oil onto and in heat exchange contact with the surface of the heated oil in the casing, whereby water and light hydrocarbon vapors are distilled from incoming crude oil upon contact with the surface of the heated liquid crude oil.

U.S. Pat. No. 1,559,036 is drawn to an electrolytic method for demulsifying oil and water emulsions, involving adding a chemical electrolyte to the emulsion, then passing an electrical current through the emulsion to separate water and oil phases.

U.S. Pat. No. 3,453,205 describes heating the crude oil to coalesce and evaporate the water, then skimming the oil into a separate compartment.

These basic methods of heating and/or distilling the water from the petroleum, and of the use of electrical current to resolve the oil-water emulsion (and combinations of these approaches) are still in use.

Additionally, as described by European Patent Publication EP 2231822, chemical methods of demulsifying oil-water emulsions and dewatering crude oil are also used. Dewatering in this fashion can be an expensive step in the process of upgrading crude oil for transportation and/or refining due to the slight differences in specific gravity between the oil and water, the expense of the chemical used, and the need for time to permit the separation to occur. Large separation vessels, for example, have been used to phase separate the water from the oil, with long residence times for the separation to take place.

European Patent Publication EP 0174399 describes the use of dehydrated and/or desalted by an aqueous formulation comprising (i) a demulsifier such as an alkylene oxide alkyl phenol-formaldehyde condensate (e.g., a polyethoxylated nonylphenol-formaldehyde condensate) and (ii) a deoiler to prevent oil entrainment into the aqueous phase such as a polyol e.g., ethylene glycol or polyethylene glycol having a molecular weight ranging from 106 to 4500.

U.S. Pat. No. 5,989,436 describes a method for dehydrating crude oil wherein an emulsion of water and oil is mixed in a stirring chamber together with a suitable amount of an emulsion breaker. The resulting mixture is subjected to separation in a two-phase separation tank to a oil-rich component and a water-rich component, the oil-rich component is then fed to a dehydrator of a high voltage charge type in which separation to a dehydrated heavy oil and a second water-rich component is effected, the two water-rich component fractions supplied from the two-phase separation tank and the dehydrator are mixed in a pipeline, the mixture thus obtained is admixed with an oil-in-water emulsion breaker and then, fed to a stirring chamber and finally separated to a second oil-containing component and a oil-free water layer in a second separation chamber.

SUMMARY OF THE INVENTION

The present invention is drawn to dewatering components and methods for their use. As particularly preferred, the invention relates to dewatering components capable of separating and/or resolving oil-in-water emulsions, water-in-oil emulsions, particularly in crude petroleum oil.

The production of oil from underground reservoirs results in crude oil containing varying amounts of water generally in the form of a water-in-oil emulsion. It is general practice to dehydrate the crude oil by allowing it to stand but oftentimes the dehydration is enhanced by the addition of a demulsifier to break the emulsion facilitating physical separation of the crude oil from the water. Following this dehydration step, the crude oil is transported to the refinery where it may undergo an initial dewatering procedure and/or subjected to the process of desalting, i.e. the removal of salts from hydrocarbon crude oil, sometimes employing the action of an electrocoalescer.

Salts in hydrocarbon crude oil are generally dissolved in small droplets of water or brine dispersed throughout the crude. Sodium chloride is the primary salt followed by calcium chloride, magnesium chloride and the sulfates of these three metals. The total salt content ranges from substantially zero to several hundred pounds per thousand barrels of crude.

These brine droplets are generally prevented from coalescing and settling by a tough, elastic film at the surface of each droplet. This film is stabilized by natural emulsifiers found in the crude, solids, and solid hydrocarbons that concentrate at the droplet surface. A desalting chemical or demulsifier displaces these natural emulsifiers and solids and weakens the film so the droplets of brine can coalesce when they contact each other.

A new oil field will frequently produce crude with negligible water and salt. As production continues, the amount of water produced increases, raising the salt content of the crude. Additional salt contamination often occurs during tanker shipment. An empty tanker takes on seawater as ballast and often uses it to wash the tanks. To minimize pollution, the top, oily layer of ballast water and the washings are segregated in a slop compartment when the ballast water is discharged. Fresh crude is then loaded on top of this slop oil and water. The entire compartment is then offloaded at the refinery.

As earlier inferred, some water and/or brine can be removed, for example, by settling and water draw off in the refinery's crude storage tanks. Demulsifiers can increase the rate and amount of settling as well as preventing sludge buildup and in cleaning tanks where sludge has already accumulated. Typically, the demulsifier formulation is injected into the turbulent crude flow as it fills the storage tank at a treat rate of from 10 to 500 ppm. The settled brine is drawn before the crude is charged to the pipestill.

A good dewatering component will efficiently break the emulsion into oil and water phases. The rate will be fast enough to result in an oil with reduced salt content going to the distillation tower. The water and salt will be substantially removed from the oil. Minimal oil will be present in the effluent water which flows from the bottom of the coalescer (i.e., known as oil carryunder). Solids will be water wet so they are similarly removed from the crude. Further the dewatering component should be able to treat many different types of crude effectively.

The dewatering component must be sufficiently stable during storage and/or use that stratification of the formulation does not occur. Stratification is highly objectionable since it causes a drastic and undesirable reduction of demulsification efficiency. Also highly objectionable for a dewatering component is a tendency to foam since the presence of foam results in a decrease of effective operating capacity and/or increases the stability of the emulsion being treated. Further, the formulation must be cost effective.

It is, accordingly, an object of certain aspects of the present invention to providing novel dewatering components and processes for dewatering, demulsifying, and/or desalting conventional whole heavy petroleum crudes, bituminous petroleum slurries, heavy petroleum crude fractions, residua, fuel oils and refinery hydrocarbon fractions.

Common dewatering components/demulsifiers include, or are based on, chemistries including:
Acid-catalyzed phenol-formaldehyde resins
Base-catalyzed phenol-formaldehyde resins
Epoxy resins
Polyamines
quaternized condensate amines
Di-epoxides
Polyols
aluminum chloride and polyaluminum chloride
diallyldimethylammonium chloride (DADMAC) and homopolymers of DADMAC poly DADMAC or pDADMAC)

The above-referenced compounds and classes of compounds are often ethoxylated (and/or propoxylated) to provide the desired degree of water/oil solubility, depending on the nature of the particular well or petroleum deposit from which the crude oil is extracted. The addition of ethylene oxide moieties increases the water solubility of the demulsifier, propylene oxide moieties tend to decrease the water solubility of the demulsifer compound. The chemical agents are also sometimes blended together; heat is also often used as a method to enhance the separation of the oil and water phases.

Large separation tanks, which may comprise heating elements, have been used, and are still used, either in batch fashion or in a continuous fashion, in conjunction with dewatering components to separate and produce the dewatered crude oil from the emulsion for further processing. In a "continuous feed" operation, crude oil emulsion and the dewatering components are fed into the separation tank, and substantially dewatered oil and substantially oil-free water phases are removed from the tank, wherein the rate of delivery of crude oil and dewatering components and the rate of removal of the oil and water phases are essentially in equilibrium. In the traditional "batch" gravity-style dewatering process, the crude oil emulsion and dewatering components are added to the tank and mixed, optionally heated to accelerate the separation process, and permitted to stand and settle until the separation is sufficiently complete that the aqueous phase and the oil phase can be separately removed.

Other methods are sometimes used in conjunction with dewatering components to aid in the crude oil dewatering process. For example, large-scale centrifuge separators can dewater crude oil emulsions containing up to 50% water, such as crude oil extractions on offshore oil platforms, and are said to be capable of producing up to 50,000 barrels of oil per day. The centrifuge may spin with a centrifugal force of up to 5,000×g or more, and permits a continuous feed of crude oil and dewatering components, and continuous production of dewatered oil, while removing water and solids from the crude feed.

Due the to specialized nature of the chemical agents used in many of these chemical dewatering components, the use of such components can be costly when these components are used in the volume necessary for the production of large quantities of dewatered oil.

In the present invention, a dewatering component may comprise a starch made, for example, from corn, potato, wheat, rice, cassava, tapioca and various other tubers and vegetable sources. Starches are large polycarbohydrates (polysaccharides) comprising glucose units linked by glycoside bonds. In pure starch there are two types of molecules, linear and helical amyloses, and amylopectin, which is a branched molecule. These are usually present, depending upon the source, in from about 20 to about 25% amylose and from about 75% to about 80% amylopectin. Starches are insoluble in cold water and alcohol.

Starches may be modified for particular uses; for example starches may be treated with acid or alkali. Starch may be hydrolyzed or partially hydrolyzed with acid or enzymes to produce porous starch granules; these will often result in the starch having occasional carboxylic acid groups, and thus will have a net anionic charge at an appropriate pH. Additionally an exogenous agent, such as a cationic or anionic moiety may be bonded to the starch molecules to provide a desired, and sometime more substantial, charge.

In a particularly preferred embodiment, the dewatering composition comprises a starch that is hydrolyzed using acid, and then modified using a quaternary ammonium reagent to render the starch with a net cationic charge. Materials having a cationic charge have increased water solubility and affinity for negatively charged materials.

For example, a food grade cornstarch such as Cargill Plus 05035 Starch may be derivatized as follows to make a cationic starch-dewatering component as follows:

EXAMPLE 1

| Formula 1 | |
|---|---|
| Soft Water | .3814 LB |
| Cargill Plus 05035 Starch (acid hydrolyzed corn starch) | .2318 LB |
| Sodium Hydroxide 50% membrane grade | .0570 LB |
| Sodium Hydroxide 50% membrane grade | .0308 LB |
| Quat 188 (65%) Cationic Monomer (Dow ®) | .2912 LB |
| Hydrochloric Acid | .0058 LB |
| Kathon LX 1.5% | .0020 LB |

Quat 188 (64%) Cationic Monomer is an aqueous solution of N-(3-chloro-2-hydroxypropyl)trimethylammonium chloride. This reagent can be converted to its epoxide form by treatment with strong base (NaOH); the resulting epoxide is highly reactive with, for example, the hydroxyl groups of carbohydrates such as starch. Kathon LX 1.5% is a microbiocide.

The water and 0.0570 lb of NaOH are combined and heated within a closed container in a water bath to between about 50° C. and about 85° C.; the powdered starch is then added and slurried for 5 minutes. The addition of base at this optional step causes hydrolysis of the polysaccharide and prepares the starch for the subsequent derivitization; it is also thought to open the sheaf of raw starch, thereby causing the granule to become more soluble in water. The treatment with base also degrades the starch backbone and de-protonates hydroxyl moieties within the starch so they will be more susceptible to reaction with the epoxide form of the Quat 188 reagent.

The Quat 188 is then mixed with the second aliquot of NaOH (0.0308), and this solution is slowly added to the suspended starch; because the Quat/NaOH reagent generates heat upon dilution it is added slowly at a rate determined by the overall temperature of reaction; the reaction temperature is preferably not permitted to rise above about 80° C. to about 85° C. The reaction is allowed to continue for about 4 hours with stirring. After the reaction is deemed completed, the hydrochloric acid is added to bring the pH to about 7.5 to about 8.5, and the Kathon LX 1.5% is added as a preservative.

Following reaction, the product cationic starch comprises the ether-linked hydroxypropyl trimethylammonium moiety as follows:

$$\text{Starch(C)—O—CH}_2\text{—CH(OH)—CH}_2\text{—N}^+\text{—(CH}_3)_3$$

EXAMPLE 2

| Formula 2 | |
|---|---|
| Soft Water | .2994 |
| Cargill Gum 05039 Starch (acid hydrolyzed corn starch) | .1692 |
| Sodium Hydroxide 50% membrane grade | .0416 |
| Quat 188 (65%) Cationic Monomer (Dow ®) | .0842 |
| Soft Water | .3801 |
| Muriatic/Hydrochloric Acid | .0205 |
| Kathon LX 1.5% | .0050 |

These reagents are used to produce the cationic starch in much the same manner as for Formula 1, except in this case the partially hydrolyzed starch is not pre-treated with NaOH before addition of the Quat 188 reagent and NaOH. As above hydrolysis is halted by neutralization with HCl, then the Klathon LX 1.5% is added to the solution.

Following reaction and washing, this product cationic starch also comprises the ether-linked hydroxypropyl trimethylammonium moiety as follows:

Starch(C)—O—CH$_2$—CH(OH)—CH$_2$—N$^+$—(CH$_3$)$_3$

One of ordinary skill in the art will immediately realize that there are myriad ways in which starch may be given a positive charge. For example, and without limitation, reagents such as 1,1,1,n-Tris(3-chloro-2-hydroxypropyl) amine and glycidyl trimethyl ammonium acetate, other ammonium-containing reagents and agents containing amino, imino, euphonium or phosphonium groups can be used in place of the Quat 188 reagent to modify starch and render it cationic. Furthermore, while the above reaction scheme takes place in aqueous solution, there exist many different methods to make cationic starch; see e.g., Kuo et al., CARBOHYDRATE POLYMERS 69 (2007) 544-553 and Carr et al., STARCH/STÄRKE 33 (1981) Nr. 9, S. 310-312. Thus, a "dry-state" method of cationic starch preparation is described in U.S. Pat. No. 4,127,563; another "dry" method involves adding the reagent to dry starch during extrusion (see e.g., Gimmler et al., 46 STARCH/STÄRKE (1994) 268-276); a semi-dry method involves spraying reagent onto the starch and then the mixture exposed to heat (see e.g., Hellwig et al., 44 STARCH/STÄRKE (1992) 68-74); Heinze et al. (44 STARCH/STÄRKE (2004) 288-296) describe preparation of cationic starches using dissolution in dimethyl sulfoxide (DMSO) or suspension in water in order to reduce the amount of residual reagents in the final product.

Similarly, the person of ordinary skill in the art will recognize that starch may be obtained from many different vegetable sources other than corn (including but not limited to potato, wheat, rice, cassava, and tapioca); any such starches may be used in the dewatering components of the present invention. Although not absolutely necessary, it is often desirable that the starch be modified (for example by hydrolysis) prior to derivitization. For example, acid and enzymatic hydrolysis of starch results in the formation of pores within the starch granule, greatly increasing the surface area of the starch granule and thus increasing the potential degree of substitution of the starch with a cationic moiety.

The degree of substitution (DS; number of cationic groups per 100 starch monomers) of the cationic starches of the present invention may range from about 0.0075 to about 0.4 or more. In certain applications it may be desired that the degree of substitution is, for example, from about 0.01 to about 0.4; or from about 0.015 to about 0.4; or from about 0.02 to about 0.4; or from about 0.025 to about 0.4; or about 0.03 to about 0.4; or from about 0.035 to about 0.4; or from about 0.04 to about 0.4; or from about 0.05 to about 0.4; or from about 0.06 to about 0.4; or from about 0.07 to about 0.4; or from about 0.08 to about 0.4; or from about 0.09 to about 0.4; or from about 0.1 to about 0.4; or from about 0.15 to about 0.4.

In other applications it may be desired that the DS is from about 0.01 to about 0.4; or from about 0.01 to about 0.35; or from about 0.02 to about 0.3; or from about 0.01 to about 0.25; or from about 0.01 to about 0.2; or from about 0.01 to about 0.15; or from about 0.01 to about 0.1; or from about 0.01 to about 0.05.

It will be understood that the disclosure of ranges such as those listed above in this specification are intended to disclose, and do disclose and provide a written description of, each and every point between the listed endpoints provided, as expressed as decimal fractions to the nearest 0.01.

In other preferred embodiments of the present invention the dewatering component comprises a cationic starch in combination with a tannin component. Tannins are a family of polyphenolic compounds containing hydroxyl groups and often carboxyl groups; tannins in general tend to form complexes with proteins and other organic compounds and macromolecules. In nature tannins are found in a large number of plant species, including both gymnosperms (such as pines) and angiosperms (such as oaks), molecules called "pseudo tannins" (which may include gallic acid, flavan-3-ols, clorogenic acid) are found in coffee, cacao, and tea. Additionally, synthetic tannins (synthetic polyphenolic compounds) have been made, such as phenol-formaldehyde based resins, particularly those termed "novolacs" having a formaldehyde to phenol ratio of less than one and cross-linked with methylene or dimethylene bridges. The presence of tannins can be tested by the ability to precipitate proteins.

Generally, tannins occur in three major classes, classified by the monomer unit of the tannin. In one class, the hydrolysable tannins, the monomer comprises a gallic acid monomer unit. The second class, the non-hydrolysable (or condensed) tannins, the monomer unit is flavone. Both of the first tannin classes can be extracted from plants. The third tannin class, the phlorotannins, is extracted from brown algae, and comprises a phlorogluconol subunit. Particularly in the flavone-derived tannins, the monomer is polymerized and further hydroxylated in order to yield the relatively high molecular weight polyphenol motif characteristic of tannins. A tannin must generally have at least about 12 hydroxyl groups and at least about five phenyl groups to bind proteins substantially. Tannins are generally completely water-soluble. Tannins may have molecular weights ranging from about 500 Da to over 20,000 Da.

Although aqueous tannin solutions are generally at least lightly acid, in certain applications in a dewatering component the tannins may be present in solution as acidified tannins at a pH of about 2. For example, commercially available tannin aqueous solutions such as Floquat™ FL 5323 (SNF Inc., Riceboro, Ga.), may comprise acidified tannic substances at a concentration of about 25% to about 35% by weight at a pH of as low as about 2. However, tannins can be modified to comprise cationic charges as well; a commercial product called Floccotan™ comprises amine-modified wattle bark tannins having active amine groups appended thereto to create an amphoteric tannin, depending upon the pH of the solution.

In certain embodiments the dewatering component of the present invention comprises at least one of a cationic starch and a tannin, in combination with at least one additional demulsifier.

Metal demulsifiers include, without limitation, aluminum demulsifiers and iron demulsifers. Aluminum demulsifers include, without limitation, aluminum sulfate, aluminum choride, aluminum chlorohydrate, sodium aluminate, polyaluminum chloride, polyaluminum sulfur chloride, polyaluminum silicate chloride, and forms of any of these salts in conjunction with organic polymers. Iron demulsifers include, without limitation, ferric sulfate, ferrous sulfate, ferric chloride, ferric chloride sulfate, polyferric sulfate, and forms of any of these salts in conjunction with organic polymers.

Additional demulsifiers may also include, without limitation, polymeric demulsifiers. Polymeric demulsifers or derivatives hereof include, without limitation, activated silica, extracts from seeds of the Nirmali tree (which comprise an anionic, mainly proteinacious, demulsifier), natural starches, anionic oxidized starches, amine-treated starches and starch derivatives, guar gums, chitosan, alginates. An advantage of such polymers is that they are biodegradable and virtually toxin free. Synthetic polymers may include, without limitation, acrylate and polyacrylamide-based compounds, pDADMAC-based quaternary ammonium compounds, polyethyleneimine (PEI), other polyamines, and quaternized condensate amines (such as, without limitation, those described in U.S. Pat. Nos. 4,197,350 and 5,750,492).

In preferred (and non-exclusive) embodiments, the dewatering components of the present invention comprise a cationic starch; or comprise a cationic starch and a tannin; or comprise a cationic starch in the absence of a metal salt; or comprise a cationic starch in the absence of an aluminum salt; or comprise a cationic starch in the absence of an iron salt; or comprise a cationic starch and a naturally occurring polymer; or comprise a cationic starch and a synthetic polymer other than tannin; or comprise a cationic starch in the absence of an naturally occurring polymer other than tannin; or comprise a cationic starch in the absence of an synthetic polymer.

In additional preferred (and non-exclusive) embodiments, the dewatering components of the present invention comprise an acidified unmodified tannin; or comprise an acidified modified tannin; or comprise a tannin in the absence of a metal salt; or comprise a tannin in the absence of an aluminum salt; or comprise a tannin in the absence of an iron salt; or comprise a tannin and a different naturally occurring polymer; or comprise a tannin and a synthetic polymer; or comprise a tannin in the absence of another naturally occurring polymer; or comprise a tannin in the absence of an synthetic polymer.

In additional preferred (and non-exclusive) embodiments, the dewatering components of the present invention comprise a cationic starch and at least one additional demulsified component; or a cationic starch and at least two additional demulsifer components, or a cationic starch and at least three additional demulsifer components; or a cationic starch and at least four additional demulsifer components.

In additional preferred (and non-exclusive) embodiments, the dewatering components of the present invention comprise a tannin and at least one additional demulsifer component; or a tannin and at least two additional demulsifer components, or a tannin and at least three additional demulsifer components; or a tannin and at least four additional demulsifer components.

In additional preferred (and non-exclusive) embodiments, the dewatering components of the present invention comprise a tannin and at most one additional demulsifer component; or a tannin and at most two additional demulsifer components, or a tannin and at most three additional demulsifer components; or a tannin and at most four additional demulsifer components.

In additional preferred embodiments the dewatering components of the present invention comprise a cationic starch having a degree of substitution (DS; number of cationic groups per 100 starch monomers) from about 0.0075 to about 0.4 or more, or from about 0.01 to about 0.4; or from about 0.015 to about 0.4; or from about 0.02 to about 0.4; or from about 0.025 to about 0.4; or from about 0.03 to about 0.4; or from about 0.035 to about 0.4; or from about 0.04 to about 0.4; or from about 0.05 to about 0.4; or from about 0.06 to about 0.4; or from about 0.07 to about 0.4; or from about 0.08 to about 0.4; or from about 0.09 to about 0.4; or from about 0.1 to about 0.4; or from about 0.15 to about 0.4.

In additional preferred embodiments the dewatering components of the present invention comprise a cationic starch having a degree of substitution from about 0.01 to about 0.4; or from about 0.01 to about 0.35; or from about 0.02 to about 0.3; or from about 0.01 to about 0.25; or from about 0.01 to about 0.2; or from about 0.01 to about 0.15; or from about 0.01 to about 0.1; or from about 0.01 to about 0.05.

In additional preferred embodiments the dewatering composition of the present invention comprises a cationic starch and at least one anionic component.

EXAMPLE 3

| Exemplary Dewatering Component 1 | |
| --- | --- |
| Cationic Starch Preparation of Formula 1 | 60% (by weight) |
| Floquat FL 5323 acidified tannin preparation | 40% (by weight) |

EXAMPLE 4

| Exemplary Dewatering Component 2 | |
| --- | --- |
| Cationic Starch Preparation of Formula 2 | 60% (by weight) |
| Floquat FL 5323 acidified tannin preparation | 40% (by weight) |

EXAMPLE 5

| Exemplary Dewatering Component 3 | |
| --- | --- |
| Cationic Starch Preparation of Formula 1 | 50% (by weight) |
| Aluminum Sulfate | 50% (by weight) |

EXAMPLE 6

| Exemplary Dewatering Component 4 | |
| --- | --- |
| Cationic Starch Preparation of Formula 2 | 50% (by weight) |
| Polyaluminum chloride | 50% (by weight) |

EXAMPLE 7

| Exemplary Dewatering Component 5 | |
| --- | --- |
| Cationic Starch Preparation of Formula 1 | 60% (by weight) |
| Quaternized Amine Condensate | 30% (by weight) |
| Aqueous Tannin preparation (25-35% by weight) | 40% (by weight) |

EXAMPLE 8

| Exemplary Dewatering Component 6 | |
|---|---|
| Cationic Starch Preparation of Formula 1 | 60% (by weight) |
| Anionic polyacrylamide preparation | 40% (by weight) |

EXAMPLE 9

| Exemplary Dewatering Component 7 | |
|---|---|
| Cationic Starch Preparation of Formula 1 | 30% (by weight) |
| Quaternized Amine Condensate | 30% (by weight) |
| Aqueous Tannin preparation (25-35% by weight) | 40% (by weight) |

EXAMPLE 10

| Exemplary Dewatering Component 8 | |
|---|---|
| Cationic Starch Preparation of Formula 1 | 50% (by weight) |
| Quaternized Amine Condensate | 50% (by weight) |

EXAMPLE 11

| Exemplary Dewatering Component 8 | |
|---|---|
| Cationic Starch Preparation of Formula 1 | 25% (by weight) |
| Quaternized Amine Condensate | 25% (by weight) |
| Polyaluminum chloride | 50% (by weight) |

EXAMPLE 12

| Exemplary Dewatering Component 9 | |
|---|---|
| Cationic Starch Preparation of Formula 2 | 60% (by weight) |
| Quaternized Amine Condensate | 30% (by weight) |
| Aqueous Tannin preparation (25-35% by weight) | 40% (by weight) |

EXAMPLE 13

| Exemplary Dewatering Component 10 | |
|---|---|
| Cationic Starch Preparation of Formula 2 | 60% (by weight) |
| Anionic polyacrylamide preparation | 40% (by weight) |

EXAMPLE 14

| Exemplary Dewatering Component 11 | |
|---|---|
| Cationic Starch Preparation of Formula 1 | 30% (by weight) |
| Quaternized Amine Condensate | 30% (by weight) |
| Aqueous Tannin preparation (25-35% by weight) | 40% (by weight) |

EXAMPLE 15

| Exemplary Dewatering Component 12 | |
|---|---|
| Cationic Starch Preparation of Formula 1 | 50% (by weight) |
| Quaternized Amine Condensate | 50% (by weight) |

EXAMPLE 16

| Exemplary Dewatering Component 13 | |
|---|---|
| Cationic Starch Preparation of Formula 1 | 25% (by weight) |
| Quaternized Amine Condensate | 25% (by weight) |
| Polyaluminum chloride | 50% (by weight) |

EXAMPLE 17

Heavy, hydrated crude oil is fed into the bottom of a gunbarrel tank through a distributor. Simultaneously, Exemplary Dewatering Component 1 is fed into the distributor at a rate calibrated to that of the crude oil flow. The oil, water and dewatering components are dispersed using a spreader plate, if necessary. The rate of oil inflow is calibrated to the residence time required for separation of dewatered oil and water phases. The less dense oil phase rises in the tank, while the water phase occupies the bottom layer; as crude oil is fed into the tank, the dewatered oil reaches an oil outlet at the top of the tank, where it is then permitted to flow to storage. Water outlets at the bottom of the tank are opened as necessary (while flow of crude oil is temporarily halted) to permit the water phase to be removed. Sensors within the tank (or windows built into the tank) indicate the oil level and water level.

The addition of Exemplary Dewatering Component 1 results in one or more of the following advantages obtained as compared to the use of prior art dewatering chemicals: permits the dosage level of chemicals to be reduced, little or no heat to be required during the separation, higher percentage of oil recovery, reduced or absent solids settling after separation, reduced cost of chemicals, biodegradable dewatering components, and less environmentally toxic waste following use of chemicals.

EXAMPLES 18-34

The process of Example 9 is repeated with each of Exemplary Dewatering Component 2-16, with at least one of the following advantages obtained as compared to the use of prior art dewatering chemicals: permits the dosage level of chemicals to be reduced, little or no heat to be required during the separation, higher percentage of oil recovery, reduced or absent solids settling after separation, reduced cost of chemicals, biodegradable dewatering components, and less environmentally toxic waste following use of chemicals.

EXAMPLE 35

Hydrated oil is fed into an induced gas flotation tank. Simultaneously, feed water containing one of Exemplary Dewatering Components 1-16 is also fed into the bottom of the tank. Bubbles are generated in the emulsion using an impeller pump. (Other methods of bubble induction may include an eductor or sparger.) The bubbles adhere to the suspended oil droplets, causing the suspended hydrocarbons to float to the surface and form a froth layer, which is then removed by a skimmer. The froth-free water exits the float tank as the clarified effluent.

The use of the dewatering components of the present invention results in at least one of the following advantages obtained as compared to the use of prior art dewatering chemicals: permits the dosage level of chemicals to be reduced, little or no heat to be required during the separation, higher percentage of oil recovery, reduced or absent solids settling after separation, reduced cost of chemicals, biodegradable dewatering components, and less environmentally toxic waste following use of chemicals.

Those of ordinary skill in the art are aware that the dewatering components of the present invention make be used in methods using other equipment as well, for example, gravity separation or oil/water or API oil and water separators.

Any and all patents, patent publications, or printed publications (including internet publications) cited in this patent application are each hereby individually incorporated by reference herein in its entirety.

While this invention has been described with respect to various specific examples and embodiments, it is to be understood that the invention is not limited thereto and that it can be variously practiced within the scope of the following claims.

I claim:

1. A petroleum-dewatering component comprising a tannin component and a starch component, said starch component consisting essentially of a starch having a cationic charge and a degree of substitution (DS) of greater than 0.3, wherein said petroleum-dewatering component efficiently demulsifies a mixture of oil and water into a water phase having reduced oil, and an oil phase in which water is substantially removed.

2. The petroleum-dewatering component of claim 1 in liquid form.

3. The petroleum dewatering component of claim 2 wherein said starch has a cationic charge has a degree of substitution from 0.31 to about 0.4.

4. The petroleum dewatering component of claim 3 wherein said starch has a cationic charge has a degree of substitution from about 0.32 to 0.4.

5. A petroleum dewatering component comprising a tannin component and a starch component, said starch component consisting essentially of a starch having a cationic charge and a degree of substitution (DS) of greater than 0.3 and at least one additional component selected from the group consisting of: an acid-catalyzed phenol-formaldehyde resin, a base-catalyzed phenol-formaldehyde resin, an epoxy component, an oxide, a polyamine, a quaternized condensate amine, a di-epoxide, a polyol, a metal salt, and an acrylamide, wherein said petroleum-dewatering component efficiently demulsifies a mixture of oil and water into a water phase having reduced oil, and an oil phase in which water is substantially removed.

6. The petroleum-dewatering component of claim 5 comprising a polyol.

7. The petroleum-dewatering component of claim 5 wherein said at least one additional component comprises a metal salt.

8. The petroleum-dewatering component of claim 5 wherein said at least one additional component comprises an oxide.

9. The petroleum-dewatering component of claim 5 wherein said at least one additional component comprises a quaternary condensate amine.

10. The petroleum-dewatering component of claim 5 comprising a synthetic demulsifier other than tannin.

11. The petroleum-dewatering component of claim 5 comprising a biocide.

12. The petroleum-dewatering composition of claim 6 comprising a metal salt.

13. The petroleum-dewatering composition of claim 6 comprising an oxide.

* * * * *